G. K. Farrington,
Clothes Pin.
No. 104,720. Patented June 28, 1870.
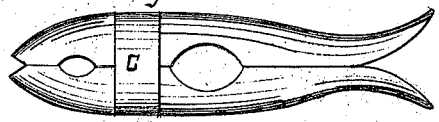
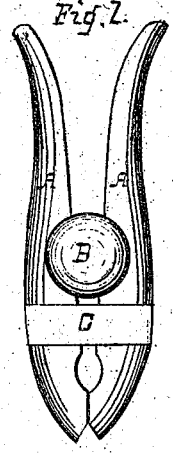
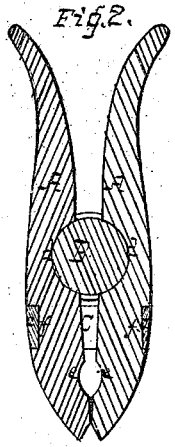
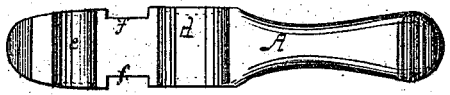
Witnesses:
S. J. Noyes
T. H. Pierson
Inventor:
Geo. K. Farrington by
H. W. Beadle atty

United States Patent Office.

GEORGE K. FARRINGTON, OF ALCATRAZ ISLAND, CALIFORNIA.

Letters Patent No. 104,720, dated June 28, 1870.

IMPROVED CLOTHES-PIN.

The Schedule referred to in these Letters Patent and making part of the same

To all whom it may concern:

Be it known that I, GEORGE K. FARRINGTON, of Alcatraz Island, county of San Francisco, State of California, have invented an Improved "Clothes-Pin;" and I do hereby declare that the following is a full, clear, and exact description of the same, reference being had to the accompanying drawing and to the letters of reference marked thereon.

The nature of my invention consists in providing a spool or axis, upon which the two arms of the pin operate. An elastic band is placed around the pin below the spool, which holds the two arms in place, and imparts the necessary holding force upon the line or object which the pin is caused to grasp.

In the drawing—

Figure 1 is a plan of a clothes-pin embodying my improvement.

Figure 2 is a sectional elevation of the same.

Figures 3, 4, 5, and 6 are details.

Like letters refer to like parts.

To enable others skilled in the art or science to which it most nearly appertains to make and use my invention, I will proceed to describe its construction and operation.

A represents the two arms of the pin, which are cut away to form concavities at the sides $d\ d$ to receive the spool or roller B.

The jaws of the pin are also cut away at $c\ e$, to form a more secure grasp upon the line.

It will be observed that the two arms of the pin are precisely alike, so that they may be used upon each side at will. This construction is especially advantageous in case of the fracture of one of the arms, for another may be easily inserted to supply its place.

I make a groove, $f$, around the clamp, in which a rubber band, C, of sufficient strength, is placed, which keeps the lips of the pin together.

The spool or roller is provided with flanges to prevent lateral movement of the arms.

By this device a cheap and effective clamp or pin is had, that cannot be too easily removed from the line or object which it is caused to grasp, as is the case with the ordinary pin, and allow the renovated linen to become soiled by falling to the ground.

Having thus described my invention,

What I claim, and desire to secure by Letters Patent, is—

In a clothes-pin, of substantially the described construction, the detachable roller B, as described, for the purpose set forth.

In testimony whereof I have hereunto set my hand and seal.

GEO. K. FARRINGTON. [L. S.]

Witnesses:
C. W. M. SMITH,
E. V. SUTTER.